United States Patent [19]
Cheich et al.

[11] Patent Number: 5,715,742
[45] Date of Patent: Feb. 10, 1998

[54] SINGLE CHAMBER DYNAMIC FLOW BREWING DEVICE

[75] Inventors: Robert C. Cheich, Seven Hills; Mark V. Gorjanc, Chesterland; Donald C. Fuchs, Jr., Mentor; Brian W. Penrod, Wadsworth, all of Ohio

[73] Assignee: Signature Brands, Inc., Bedford Hts., Ohio

[21] Appl. No.: 715,849

[22] Filed: Sep. 19, 1996

Related U.S. Application Data

[63] Continuation-in-part of Ser. No. 423,170, Apr. 17, 1995, Pat. No. 5,623,864.

[51] Int. Cl.[6] ................................................... A47J 31/00
[52] U.S. Cl. ........................... 99/308; 99/305; 99/300
[58] Field of Search ........................ 99/300, 299, 302 R, 99/303, 304, 305, 302 C, 307, 308, 287, 275, 279, 316; 426/433

[56] References Cited

U.S. PATENT DOCUMENTS

| | | | |
|---|---|---|---|
| 2,924,699 | 2/1960 | Russell | 99/305 X |
| 3,469,522 | 9/1969 | Prosen | 99/308 |
| 4,751,875 | 6/1988 | Wooten, Jr. | 99/308 |

*Primary Examiner*—Reginald L. Alexander
*Attorney, Agent, or Firm*—Calfee, Halter & Griswold LLP

[57] ABSTRACT

A single chamber brewing device for brewing beverage has a single brewing chamber for receiving water and a brewing material such as tea, a thermally controlled heating element, and a thermally responsive valve for releasing brewed beverage from the brewing chamber into a container positionable underneath the brewing chamber. The heating element may be a heating and pumping element which pumps heated water into the brewing chamber to produce a dynamic flow within the brewing chamber to improve the brewing process.

3 Claims, 8 Drawing Sheets

Fig.9

SINGLE CHAMBER DYNAMIC FLOW BREWING DEVICE

RELATED APPLICATIONS

This application is a continuation-in-part of U.S. patent application Ser. No. 08/423,170, filed Apr. 17, 1995 now U.S. Pat. No. 5,623,864.

FIELD OF THE INVENTION

The present invention relates generally to automatic beverage brewing devices and, more particularly, to thermally controlled beverage brewing devices for brewing tea or the like.

BACKGROUND OF THE INVENTION

Automatic beverage brewing devices for brewing tea have heretofore been no more than automatic drip coffee makers in which tea is used instead of coffee. Water drawn from a water reservoir is heated and dripped over tea leaves held in a basket to produce tea in a carafe or receptacle. A controlled steeping period is required to extract a maximum amount of flavor from the tea leaves. Steeping requires that the tea leaves be submerged in a volume of water heated over a period of time to a temperature at which time the tea is ready to be served. Automatic brewing devices of the prior art which operate on the principle of dripping heated water through a basket do not provide a controlled temperature-dependent steeping period.

Automatic brewing devices also typically have separate reservoirs or chambers for water, brewing, and receiving the brewed beverage. Multiple chambers, combined with the requirement to transport liquid between the chambers, complicates the design and operation of such devices and increases costs and the likelihood of operational failure.

The present invention overcomes these and other disadvantages of prior art brewing devices for brewing tea or the like by a steeping process.

SUMMARY OF THE PRESENT INVENTION

The present invention provides an improved brewing device for brewing tea or the like by a steeping process in a single chamber which holds water and tea. In accordance with one aspect of the invention, a brewing device includes a brewing chamber for receiving a brewing material and liquid, a heat source for supplying heat to liquid in the brewing chamber, and a valve in an opening in the brewing chamber through which a brewed beverage is released from the brewing chamber.

In accordance with another aspect of the invention, a brewing device for preparing brewed beverage includes a brewing chamber for receiving a brewing liquid and a brewing material, a heat source attached to and in thermal communication with the brewing chamber, and a thermally responsive valve for controlling release of brewed beverage from the brewing chamber.

In accordance with another aspect of the invention, a brewing device for preparing brewed beverage by a steeping process in which a brewing material is held in water which is heated to a brewing or steeping temperature, includes a steeping chamber for receiving a brewing material and water, the steeping chamber having a thermal valve-controlled opening through which brewed beverage can exit the chamber, the thermal valve-controlled opening including a thermally responsive valve which opens in response to an increase in ambient heat, an electrically powered heat source in thermal communication with the steeping chamber, a container for receiving brewed beverage positionable underneath the brewing chamber and housing, and a cover for the steeping chamber.

These and other aspects of the invention will be apparent upon reading the following detailed description with reference to the annexed drawings.

BRIEF DESCRIPTION OF THE FIGURES In the annexed drawings.

DETAILED DESCRIPTION OF PREFERRED AND ALTERNATE EMBODIMENTS

Figure 1:
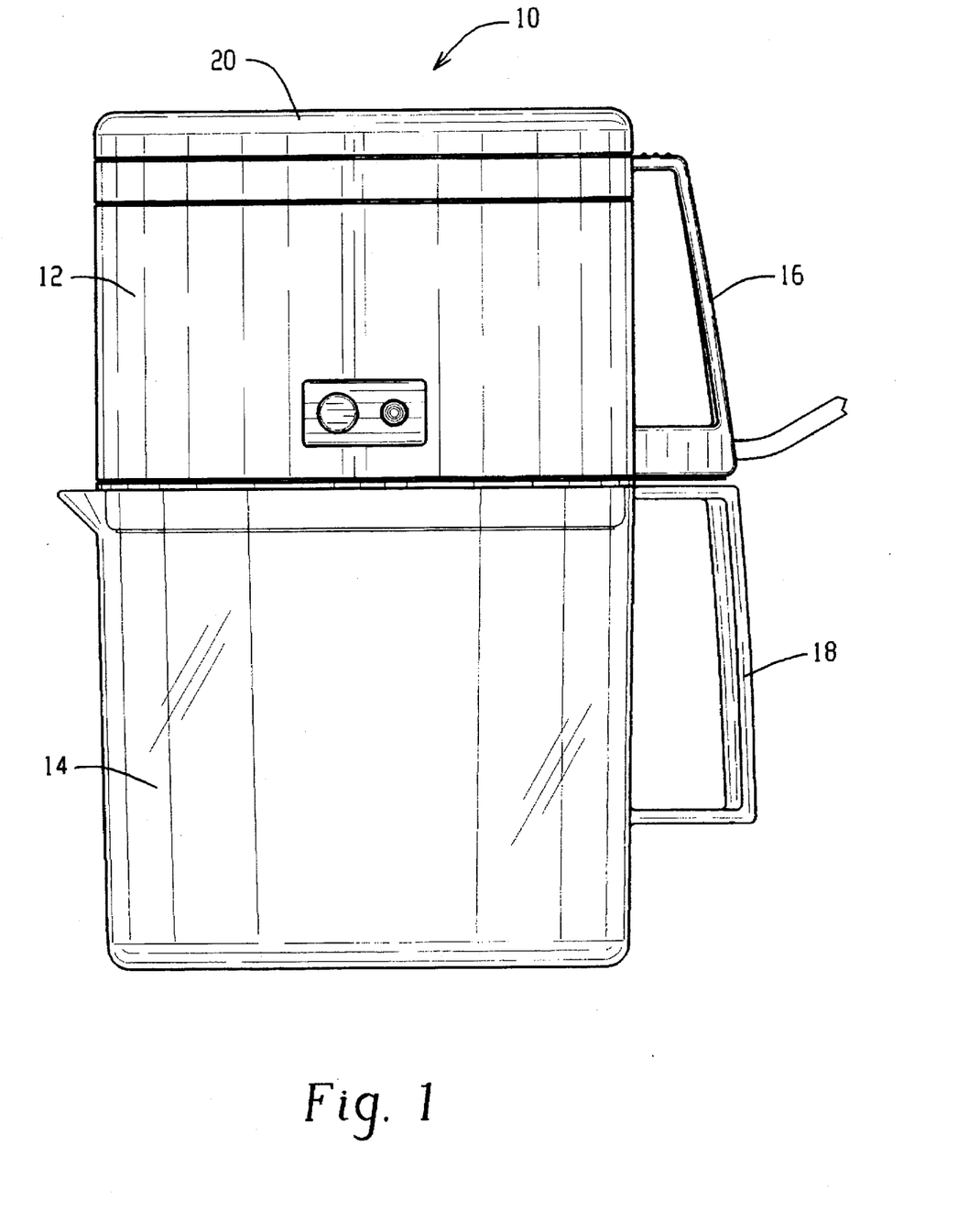
FIG. 1 is a side elevation of the brewing device of the present invention.

With reference to FIG. 1, there is illustrated a brewing device 10 which includes a brewing chamber 12 and a brewed beverage container 14. In this embodiment, brewing chamber 12 is dimensioned to be supported by and over a top opening in a brewed beverage container 14 which is in the form of a pitcher. Adjoining handles 16 and 18 facilitate manipulation of the brewing chamber 12 and container 14 in the integrated configuration shown. Handle 18 provides a gripping point to facilitate pouring of container 14 in the manner of a pitcher. A lid 20 covers an top opening in brewing chamber 12. Upon removal of brewing chamber 12 from the top opening of container 14, lid 20 can be placed to cover the top opening of container 14 which is dimensioned substantially the same as the top opening of brewing chamber 12. Of course, the exterior and interior shapes and configurations of the brewing chamber 12 and container 14 may vary greatly such as, for example, cylindrical, bulbous or globe, or otherwise configured and contoured in any manner which provides sufficient interior cavities to contain liquid and to allow gravitational draining of brewed beverage from the brewing chamber 12 into container 14 as described below. Also, the container in particular can be formed to have close visual similarity to a pitcher or carafe, and may further be constructed with insulative walls and of suitable material such as porcelain to maintain the temperature of the brewed beverage.

Figure 2:
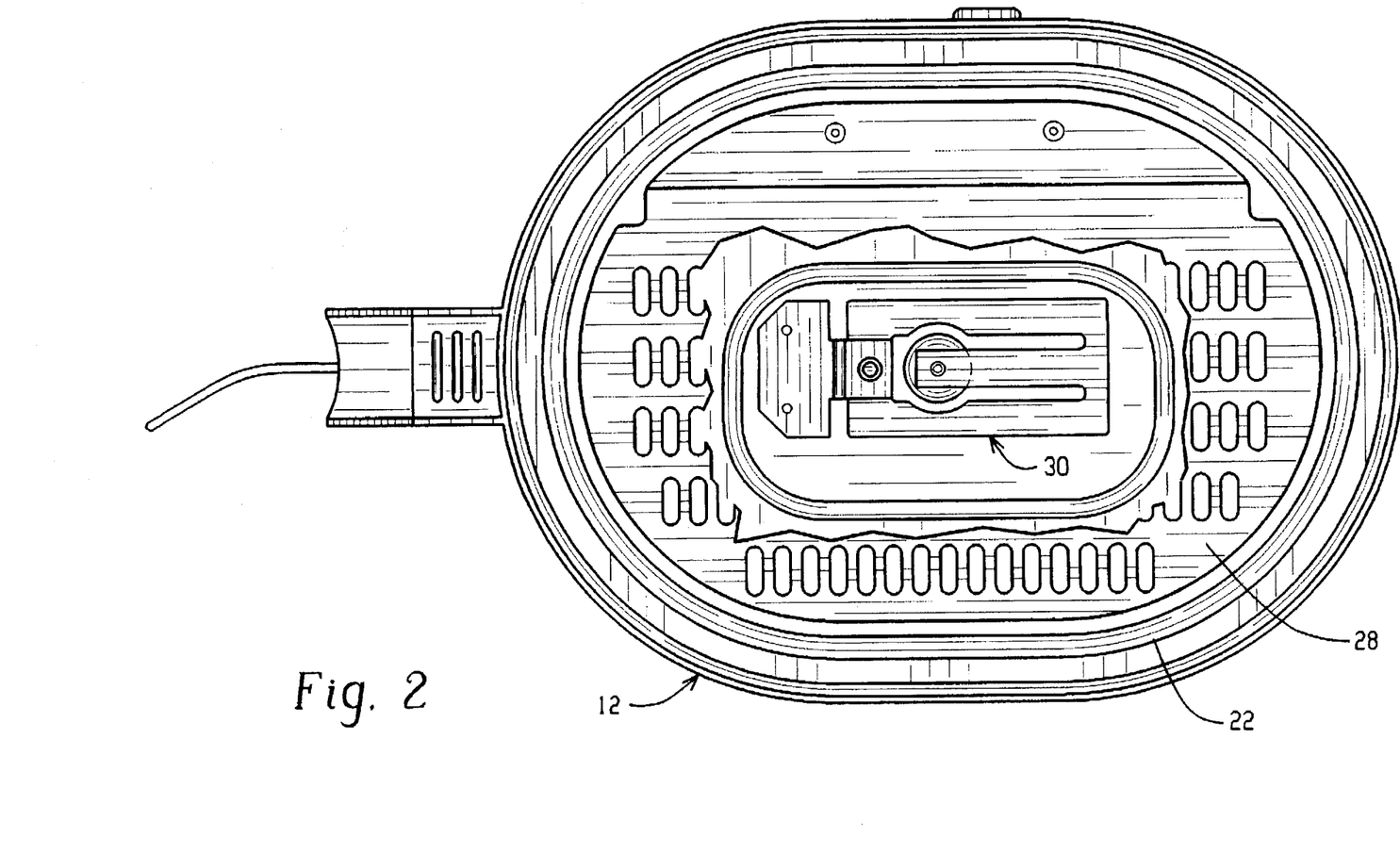
FIG. 2 is a top view of the brewing chamber portion, partially cut away, of the brewing device of the present invention.
Figure 3:
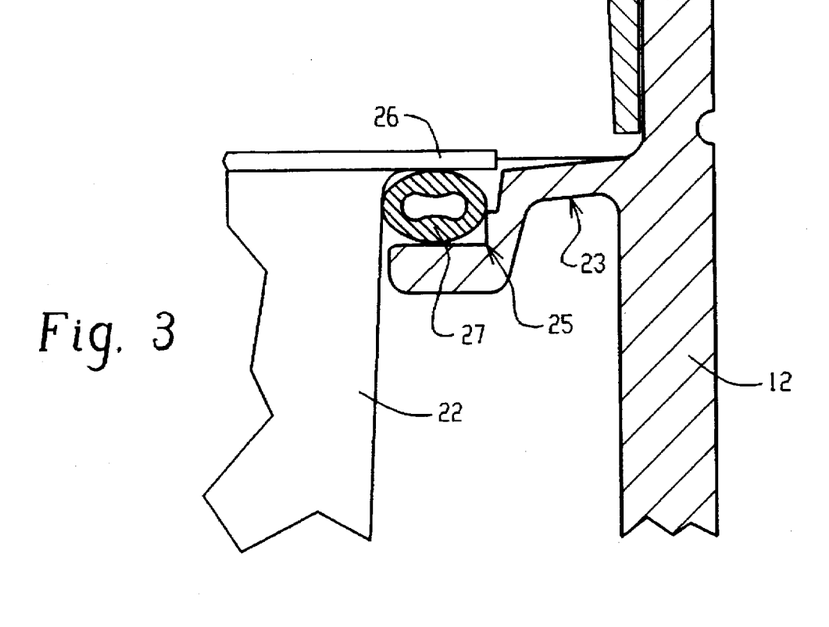
FIG. 3 is a cross-sectional view of a side wall portion of brewing chamber of brewing device of the present invention.

Referring to FIG. 2, the interior of brewing chamber 12, shown from above with cover 20 removed, includes a liner 22 which may be made of a metallic material and which fits within the walls of the brewing chamber. As shown in FIG. 3, the generally vertical walls of liner 22 are spaced inwardly from the interior surfaces of the generally vertical walls of the brewing chamber 12. This provides an insulative air gap between liner 22 and the walls of brewing chamber 12. A generally horizontal flange 26 at the top of liner 22 overlaps an interior flange 23 which extends radially inward from the brewing chamber walls and includes an annular step 25 for receiving and annular seal 27 upon which flange 26 rests. Liner 22 is thereby suspended within and not in contact with the vertical walls of brewing chamber 12, and the insulative air gap is sealed to prevent entry of moisture into the air gap or into contact with electrical components mounted on the exterior of liner 22 as described below. This arrangement also allows use of a metallic liner housed in a plastic brewing chamber even in the presence of a heat source and heated liquid within the liner without adverse effect on the surrounding plastic. The use of a metallic liner improves heat transfer efficiency from the heating element described below to liquid contained in the liner.

As further shown in FIG. 2, a perforated screen 28 is positioned horizontally near the bottom of liner 22 to support a brewing material such as tea in a bag or filter and allow brewed beverage to pass through to a valve located underneath the screen. Alternatively, a filter may be placed within liner 22 to rest upon screen 28 and receive tea or other brewing material therein. A center portion of screen 28 is cut away to reveal a thermally responsive bi-metal snap action valve 30, such as a bi-metal valve manufactured by Texas Instruments of Attelboro, Mass. A portion of the valve is mechanically moved by thermal expansion and contraction to open or occlude an opening 32 (shown in FIG. 4) in the bottom of the liner about which the valve is positioned. Valve 30 may alternatively be any of the type of thermally responsive bi-metal valves suitable for such applications, as are well known in the art, as for example the bi-metal valve described in U.S. Pat. No. 5,185,505 incorporated herein by reference. When liquid in liner 22 is heated to a temperature at which valve 30 is responsive to snap into an open position, the liquid is allowed to drain from liner 22 past valve 30 and through opening 32, thereby exiting the brewing chamber for entry into a brewed beverage receptacle such as container 14.

Figure 4:
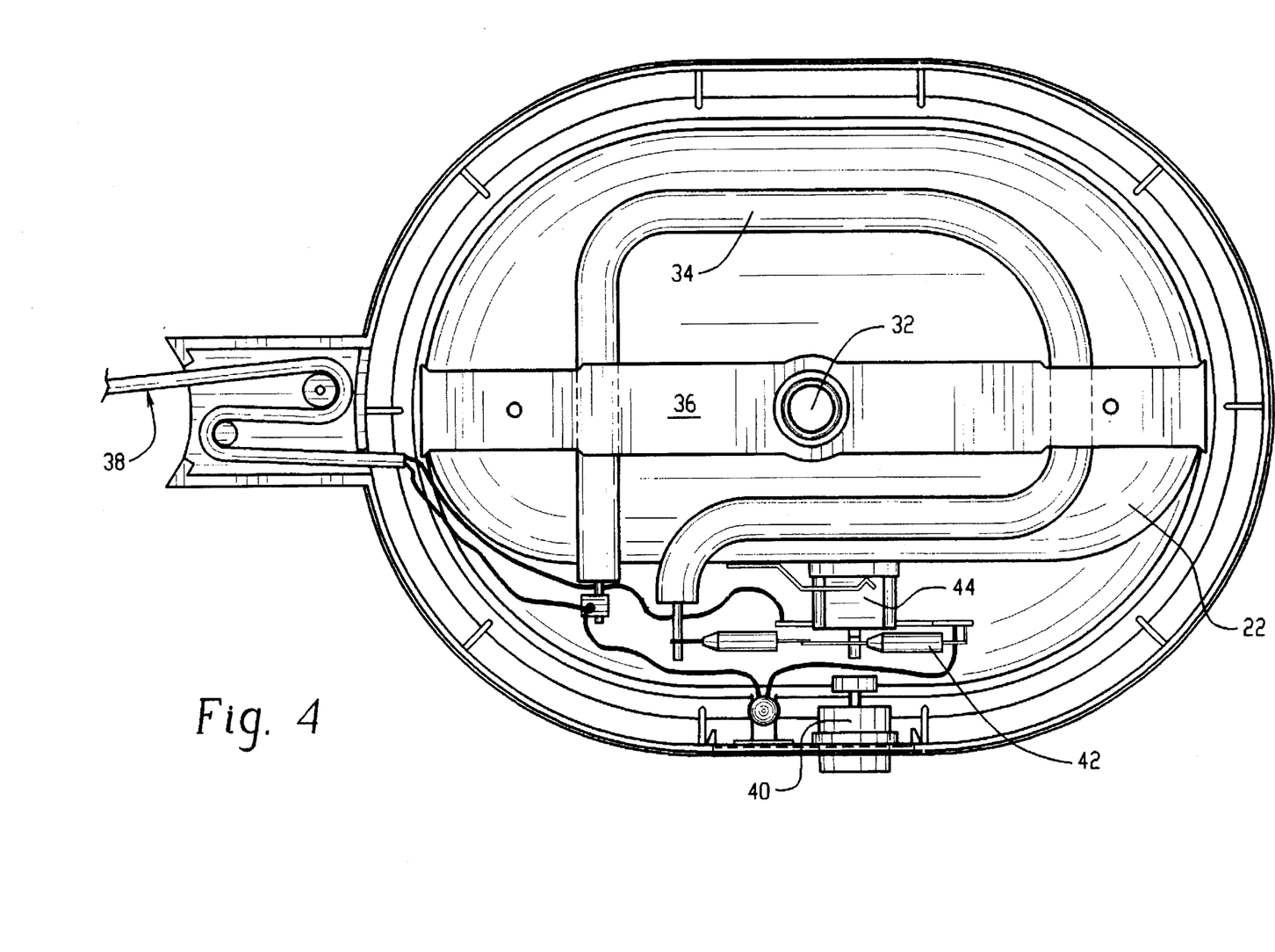
FIG. 4 is a bottom view of the brewing chamber of the brewing device of the present invention.
Figure 5:
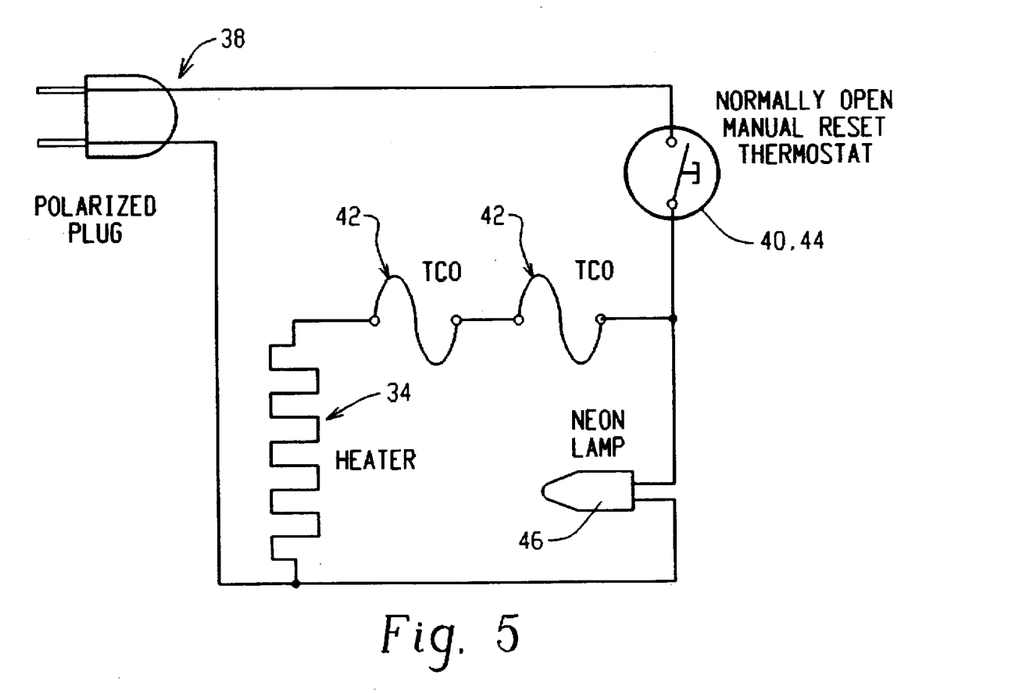
FIG. 5 is a schematic diagram of the power control circuit of the brewing device of the present invention.

FIG. 4 illustrates the bottom of brewing chamber 12 (with a protective cover removed) where an electrically resistive heating element 34 is brazed or otherwise attached to the bottom surface of liner 22 to provide thermal energy to liner 22 and any liquid contained therein. As also schematically illustrated in FIG. 5, an AC power cord 38 is connected to heating element 34 through thermal limiting fuses 42 which limit the maximum temperature reachable by element 34. A normally open manually resettable thermostat 44 is in direct contact with a wall portion of liner 22. The thermostat 44 is set at an activation temperature at which it opens to cut off power to element 34 after valve 30 has opened but before all of the liquid has drained from liner 22. Thermostat switch 40 is mounted for access from the exterior of brewing chamber 12 adjacent an LED 46 which is illuminated while power is supplied to element 34.

Also shown in FIG. 4 is a conduit 48, such as a rubber tube, connected to opening 32 in liner 22 to direct liquid passing through opening 32 through bracket 36, and through a protective cover (not shown) which covers the bottom of the brewing chamber. conduit 48 provides a direct path from the brewing chamber 12 to the container 14 and prevents moisture from reaching the electrical components.

In accordance with the described construction of the brewing device, brewed beverage such as tea or iced tea can be easily prepared, contained and dispensed by placing the brewing chamber on top of container 14, placing a brewing material such as tea bags in liner 22 of the brewing chamber, filling the brewing chamber with water in a desired amount, covering the brewing chamber with cover 20, connecting power cord 38 to an AC power source and pressing switch 40 to activate thermostat 44 thus applying electricity to heating element 34. The heating of the water with the tea in the brewing chamber prior to the opening of valve 30 accomplishes the steeping action necessary to brew tea correctly for maximum flavor. When the valve opens, brewed tea automatically drains from the brewing chamber into the container and power to element 34 is automatically cut off by thermostat 44, which state is indicated by LED 46 in a darkened mode. The brewing chamber is then removed from the container and the tea is ready for dispensing directly from container 14. To brew and prepare iced tea, a quantity of ice is placed in the container 14 at the start of the brewing process and brewed tea is drained from the brewing chamber directly onto the ice.

In an alternate embodiment of the invention, illustrated by FIGS. 6-9, a conduit water heating and pumping device, indicated generally at 50, is incorporated into the brewing chamber 12, in lieu of the aforedescribed heating element 34, to provide a single chamber dynamic flow brewing device which heats and pumps brewing water drawn from the brewing chamber back into the brewing chamber to improve flavor extraction from a brewing material in the brewing chamber. The conduit heating and pumping device 50 includes a brewing water conduit 51 having an inlet end 52 connected to an inlet port 53 in an internal sidewall 54 of brewing chamber 12; and an outlet end 55 connected to an outlet port 56 in brewing chamber 12 at an elevation above inlet port 53. By this arrangement, water introduced into the brewing chamber is pressurized into the inlet port 53 for passage through conduit 51 toward outlet port 56. The brewing chamber 12 of this embodiment is similarly dimensioned to fit together with a brewed beverage container as described above.

Figure 6:
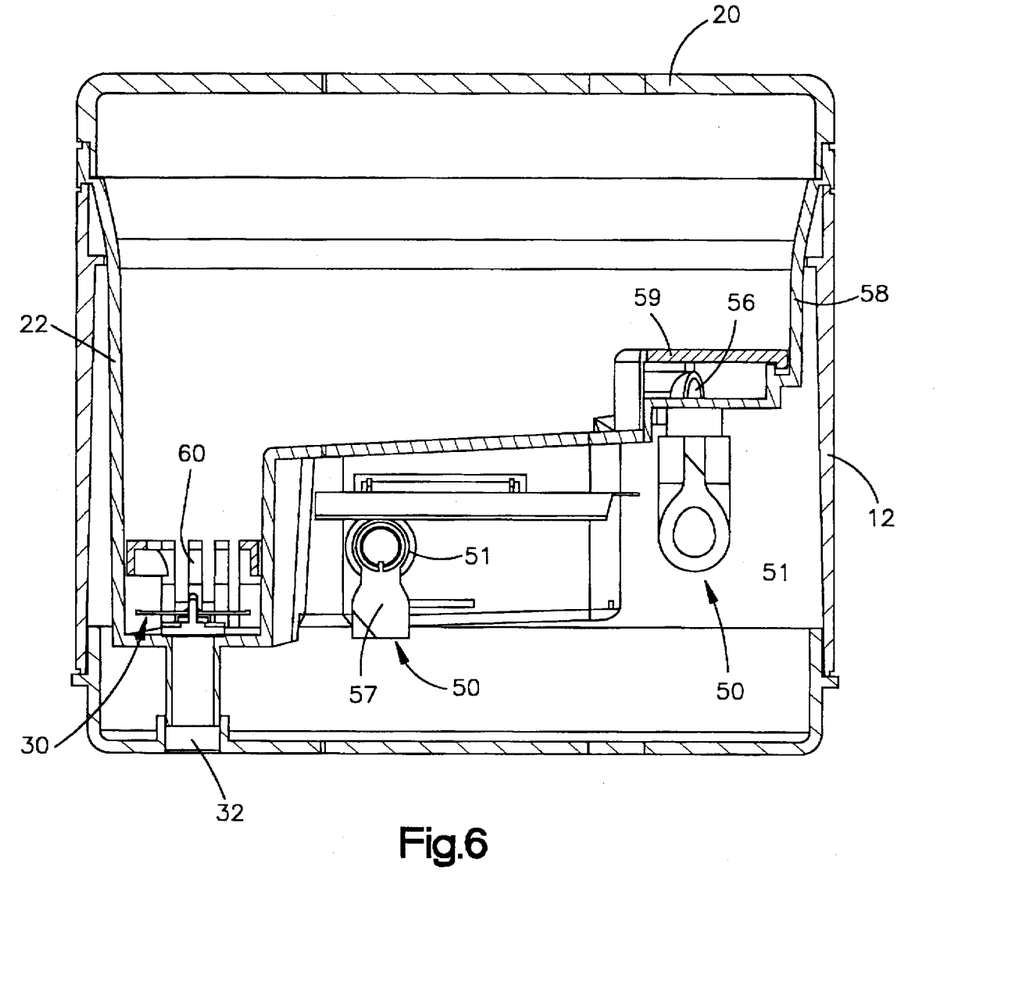
FIG. 6 is a cross-sectional view of the brewing chamber of a single chamber dynamic flow brewing device of the present invention.

As shown in FIG. 6, a section of conduit 51 is integrally formed with the resistive heating element housing 57 having an internally disposed resistive heating element electrically powered identically as heating element 34 as previously described. Heat generated by electrical energy supplied to the heating element within the heating element housing 57 is transferred to the integrally attached section of conduit 51 and to water within conduit 51 to thereby heat the water to a brewing temperature and force the heated water out through outlet port 56 into the brewing chamber 12. The construction of this section of conduit 51 integrally formed with the resistive heating element housing 57 may be, for example, as described in U.S. Pat. Nos. 4,613,745 and 5,183,998, the entire disclosures of which are hereby expressly incorporated by reference.

Figure 8:
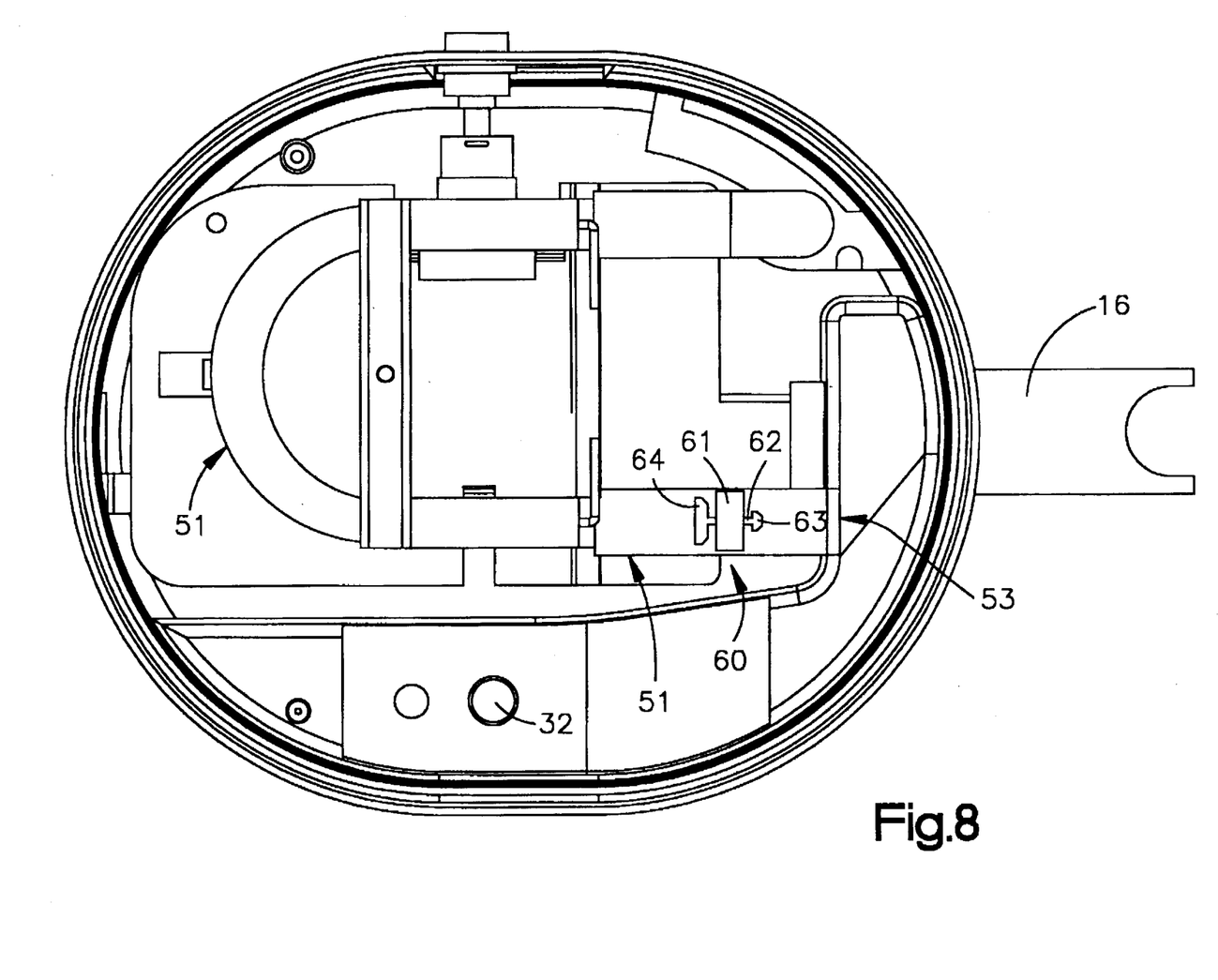
FIG. 8 is a bottom view of the brewing chamber of FIG. 6.

Within conduit 51 is a unidirectional plunger type valve 60, shown in FIG. 8, which allows flow of water into the inlet port 53 and prevents the flow of water from inlet port 53 back into the brewing chamber 12, including upon expansion of the water from heat transferred from the heating element housing 57 to conduit 51. Valve 60 has a valve housing 61 which fits within conduit 51, and an axially disposed and translatable valve stem 62, with an open position stop 63 at one end and a valve closure head 64 at an opposite end. The valve closure head is axially oriented to face away from inlet port 53 so that as heat-pressurized water within the conduit 51 is forced against the valve closure head 64 it is axially translated to seal against the valve housing 61 to prevent flow toward inlet port 53. A unidirectional flow of heated water is thereby established through conduit 51 from inlet port 53 to outlet port 56.

Figure 7:
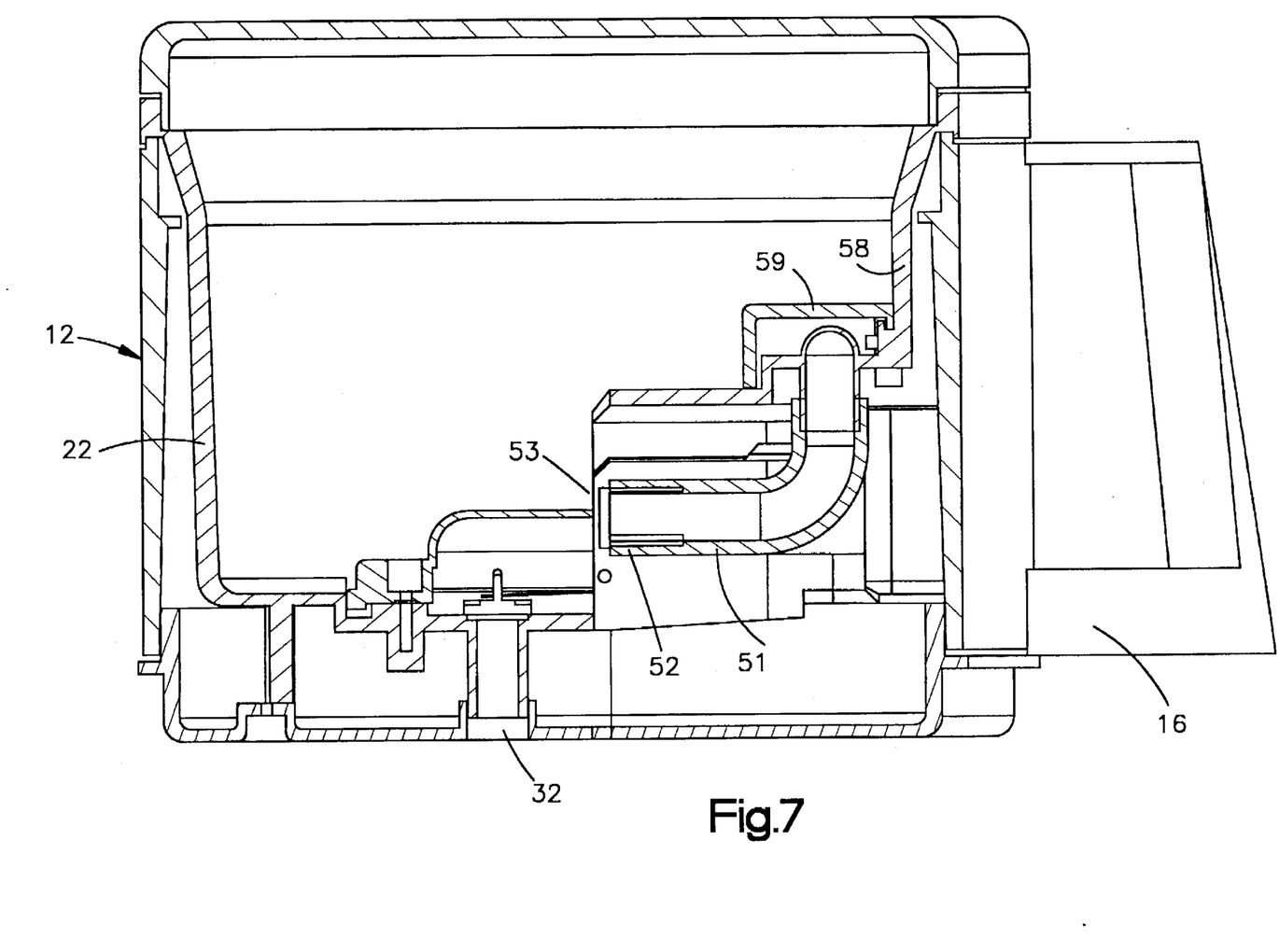
FIG. 7 is a cross-sectional view of the brewing chamber of FIG. 6 approximately orthogonal to the view of FIG. 6.
Figure 9:
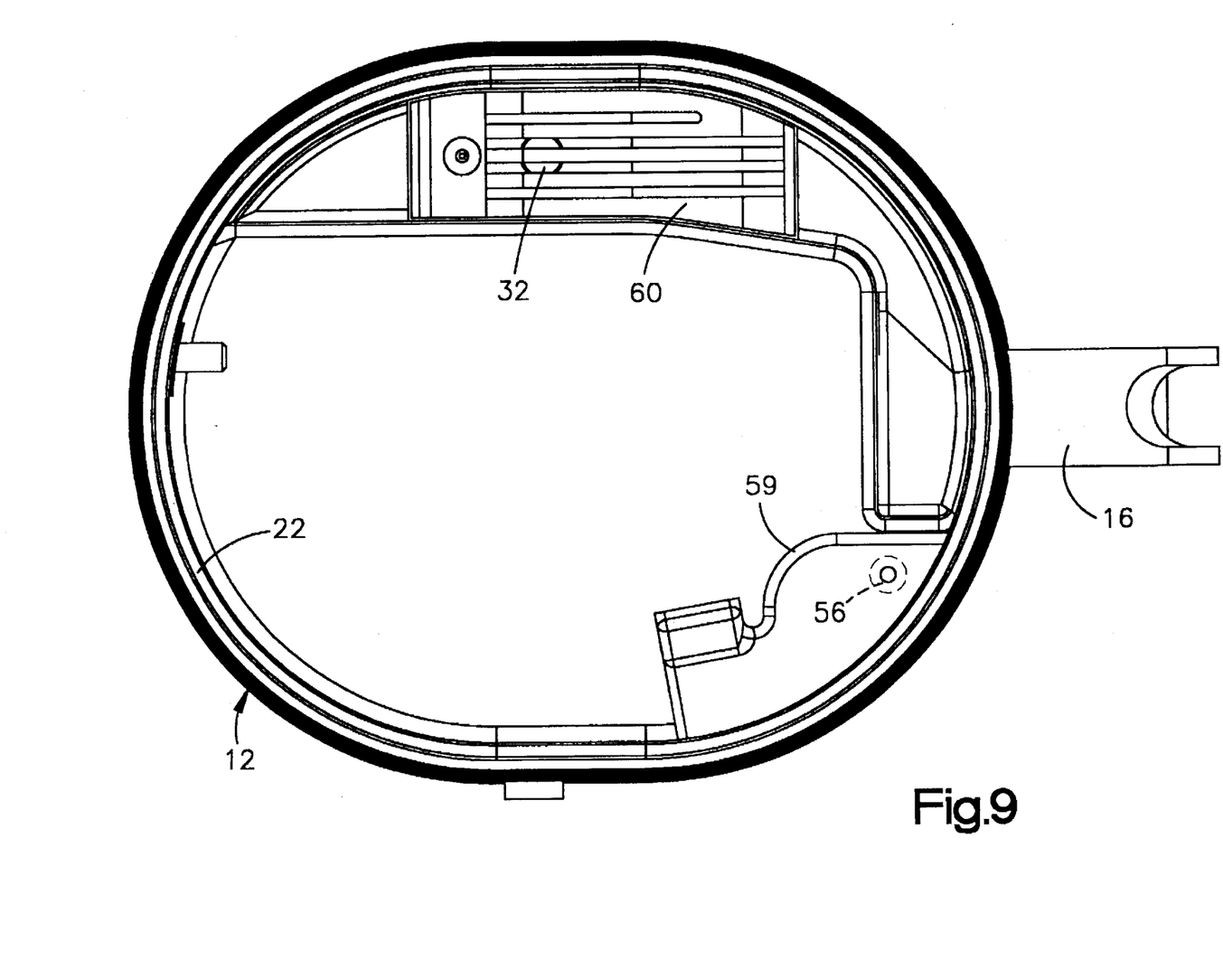
FIG. 9 is a top view of the brewing chamber of FIG. 6.

As shown in FIGS. 6, 7 and 9, outlet port 56 is positioned near a sidewall 58 of brewing chamber 12 so as to establish a dynamic flow of heated water within the brewing chamber. In operation, a quantity of water from the brewing chamber enters conduit 51 through inlet port 53 and is heated within conduit 51 through thermal communication with heating element housing 57. The water in conduit 51 expands as it is heated and, blocked from exit from inlet port 53 by valve 60, is dynamically forced out of outlet port 56 back into brewing chamber 12. The heat-pressurized water in conduit 51 is forcefully pumped by expansion out of outlet 56 to create a surge of heated water into the remaining water in the brewing chamber. The position of outlet 56 along the sidewall 58 of a modified liner 22 of the brewing chamber produces dynamic flow within the brewing chamber which effectively agitates a brewing material such as tea in the water in the brewing chamber to achieve optimal flavor extraction from a brewing material into the heated dynamically flowing water. A shroud 59 may be attached to the interior of the brewing chamber about outlet port 56 to direct or induce the desired dynamic flow and to prevent splashing or other excessive turbulence. A drain hole valve cover 69 is also attached to the interior of the brewing chamber over drain hole 32 to protect valve 32. As the heated water is forced out of conduit 51, pressure against valve closure head 64 is relieved, allowing a new quantity of water from the brewing chamber to enter conduit 51 through inlet port 53 and valve 60.

The temperature of the water in the brewing chamber gradually increases as substantially all of the water introduced into the brewing chamber is pumped through conduit 51 and heated to a point at which the bi-metal valve 30 opens to allow a brewed beverage to drain from the brewing chamber into beverage container 14. This temperature-dependent drainage function is identical to the previously described embodiment. As shown in FIGS. 6 and 7, drainage opening 32 is located in the brewing chamber at an elevation below inlet port 53 and outlet port 56. The forced dynamic flow of the heated water in the brewing chamber greatly improves flavor-extraction from a brewing material in the brewing chamber. Also, a more even temperature gradient is achieved throughout the body of water in the brewing chamber so that when the bi-metal valve opens the temperature is substantially constant throughout the brewed beverage.

Although the invention has been shown and described with respect to a particular embodiment, certain variations and modifications may become apparent to those skilled in the art. For example, the internal and/or external configurations of the brewing chamber and container may be altered to change the appearance of the device, equivalent materials may be used to construct the device, and equivalent valve mechanisms may be used to effect release of the brewed beverage from the brewing chamber at any desired temperatures, which may be generated by equivalent heating devices. All such modifications and variations are within the scope of equivalents of the claimed invention.

What is claimed is:

1. A single chamber brewing device for preparing and containing a heated brewed beverage, the device comprising, a single brewing chamber having a cavity for receiving a brewing material and liquid, a conduit connected to an inlet port and an outlet port in the brewing chamber, a heat source in thermal contact with the conduit, and a unidirectional flow valve in the conduit, whereby liquid can enter the conduit through the inlet port, absorb heat from the heat source, and be forced by thermal expansion back into the brewing chamber through the outlet port, a thermally responsive valve disposed in an opening in the brewing chamber, the valve operative to release brewed beverage from the brewing chamber through the opening, and a brewed beverage container positionable to receive brewed beverage released from the brewing chamber.

2. The single chamber brewing device of claim 1 wherein the inlet port is at an elevation below the outlet port.

3. A single chamber dynamic flow brewing device for brewing a brewed beverage by combining a brewing material with a dynamic flow of heated water, the device comprising:

a single brewing chamber having a cavity for receiving a brewing material and brewing water, a water conduit connected to an inlet port and an outlet port in the brewing chamber, a heating element in thermal contact with the water conduit;

a brewed beverage drain hole in the brewing chamber and a thermally responsive valve positioned to occlude the drain hole at one temperature and to allow drainage through the drain hole at a higher temperature, and a brewed beverage container underneath the brewing chamber.

* * * * *